(12) United States Patent
Vinogradov

(10) Patent No.: US 6,664,947 B1
(45) Date of Patent: Dec. 16, 2003

(54) SAFE AND HANDY POINTING DEVICE

(76) Inventor: Gueorgui K. Vinogradov, 5860-5 Ryuchi, Futaba-cho 306 Dragons Mansion, Nakakoma-gun, Yamanashi-Ken (JP), 407-0104

( * ) Notice: Subject to any disclaimer, the term of this patent is extended or adjusted under 35 U.S.C. 154(b) by 0 days.

(21) Appl. No.: 09/257,544

(22) Filed: Feb. 24, 1999

(51) Int. Cl.[7] .................................................. G09G 5/08
(52) U.S. Cl. ..................................... 345/163; 345/157
(58) Field of Search ................................. 345/156, 157, 345/161, 163, 164, 167; D14/402, 408, 114, 100

(56) References Cited

U.S. PATENT DOCUMENTS

| | | | |
|---|---|---|---|
| 3,835,464 A | 9/1974 | Rider | 340/324 A |
| 4,265,557 A | 5/1981 | Runge | |
| 4,494,755 A | 1/1985 | Caillouet | 273/148 B |
| D281,164 S * | 10/1985 | Kim | D13/168 |
| 4,641,857 A | 2/1987 | Galliunas | 280/821 |
| D300,324 S * | 3/1989 | Akagi et al. | D14/408 |
| 4,862,165 A * | 8/1989 | Gart | 341/20 |
| D306,017 S * | 2/1990 | Shulman et al. | D14/410 |
| D307,137 S * | 4/1990 | Alfonso | D14/410 |
| 5,063,289 A | 11/1991 | Jasinski | 250/221 |
| 5,122,654 A | 6/1992 | Koh | 250/221 |
| 5,171,978 A | 12/1992 | Mimlitch | 250/221 |
| 5,214,799 A | 6/1993 | Fabry | 2/161 R |
| 5,252,970 A | 10/1993 | Baronowsky | 341/20 |
| D340,925 S * | 11/1993 | Yurkonis et al. | D14/407 |
| 5,296,871 A * | 3/1994 | Paley | 340/407.2 |
| 5,340,067 A | 8/1994 | Martin | 248/118 |
| 5,355,147 A | 10/1994 | Lear | 345/156 |
| 5,366,436 A | 11/1994 | Gibney | 601/40 |
| 5,374,942 A * | 12/1994 | Gilligan et al. | 345/157 |
| 5,404,152 A | 4/1995 | Takao | 345/157 |
| 5,417,645 A | 5/1995 | Lemmen | 602/21 |
| 5,466,215 A | 11/1995 | Lair | 602/21 |
| D369,154 S * | 4/1996 | Powell | D14/403 |
| D370,219 S * | 5/1996 | Blumer et al. | D14/403 |
| 5,530,455 A | 6/1996 | Gillick | 345/163 |
| D374,867 S * | 10/1996 | Canavan | D14/114 |
| 5,570,112 A | 10/1996 | Robinson | 345/163 |
| 5,576,733 A | 11/1996 | Lo | 345/163 |

(List continued on next page.)

FOREIGN PATENT DOCUMENTS

| | | | |
|---|---|---|---|
| DE | 196 16 450 | 10/1997 | |
| EP | 0 279 555 | 8/1988 | |
| FR | 2 698 986 | 6/1994 | |
| JP | 08286782 A | 11/1996 | G06F/1/16 |
| JP | 08286827 A | 11/1996 | G06F/3/033 |
| JP | 8305491 | 11/1996 | G06F/3/033 |
| WO | WO 998 37509 | 8/1998 | |

OTHER PUBLICATIONS

Patent abstract of Japan vol. 013, No. 104 (P–842) Mar. 13, 1989 & JP 63 282827 (Hitachi Ltd).
Doc. No. 08286782 A, Publication Date Nov. 01, 1996, Masatoshi, Arm rest.
Doc. No. 8305491, Publication Date Nov. 22, 1996, Yoshiharu, Compatible device for mouse input device and track ball input device for computer.
Doc. No. 08286827 A, Publication Date Nov. 01, 1996, Minoru, Data input device.

*Primary Examiner*—Kent Chang

(57) ABSTRACT

An inherently safe and handy pointing device (22) comprises a bottom (20), housing (30) attached on top of the bottom, means for controlling a relative coursor position, a plurality of actuators, at least one to three, and preferably two of which are mounted adjacent to a front surface (24), the front side actuators (34) being designed to be activated by finger moves or pressure directed substantially horizontally or vertically upward, the front side actuators being further designed to be protected from actuation by substantially vertical downward loads.

14 Claims, 11 Drawing Sheets

U.S. PATENT DOCUMENTS

| | | | |
|---|---|---|---|
| 5,581,277 A | 12/1996 | Tajiri | 345/163 |
| D377,485 S | 1/1997 | Kaneko | D14/114 |
| D377,486 S | 1/1997 | Shih | D14/114 |
| D378,517 S | 3/1997 | Kaneko | D14/114 |
| 5,630,566 A | 5/1997 | Case | 248/122.1 |
| 5,636,822 A | 6/1997 | Hendershot | 248/346.01 |
| 5,653,678 A | 8/1997 | Fulk | 601/33 |
| D389,820 S | 1/1998 | Martella | D14/114 |
| 5,707,345 A | 1/1998 | Fulk | 601/33 |
| 5,726,683 A | 3/1998 | Goldstein | 345/168 |
| D396,034 S | 7/1998 | Whitsing | D14/114 |
| 5,781,127 A | 7/1998 | Kleve | |
| 5,805,142 A | 9/1998 | Byrne | 345/163 |
| D399,835 S | 10/1998 | Goldstein | D14/114 |
| 5,818,422 A | 10/1998 | Kwon | 345/157 |
| 5,826,842 A | 10/1998 | Paulse | 248/118.1 |
| 5,841,425 A * | 11/1998 | Zenz, Sr. | 345/163 |
| 5,894,302 A * | 4/1999 | Scenna et al. | 345/163 |
| D411,837 S * | 7/1999 | Sheehan | D14/114 |
| D423,488 S * | 4/2000 | O'Keeffe et al. | D14/117.3 |
| 6,091,403 A * | 7/2000 | Bland | 345/163 |
| D431,037 S * | 9/2000 | Varga et al. | D14/409 |
| D440,224 S * | 4/2001 | Jones et al. | D14/402 |

* cited by examiner

FIG. 1A  FIG. 1B

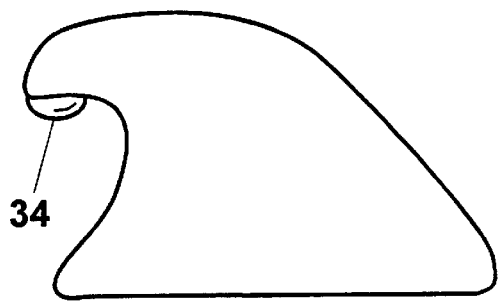
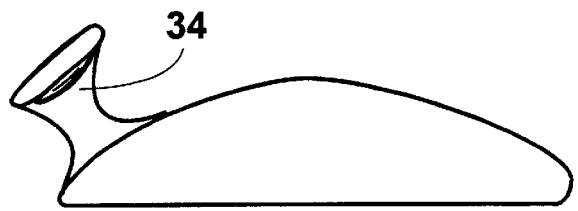
FIG. 12          FIG. 13
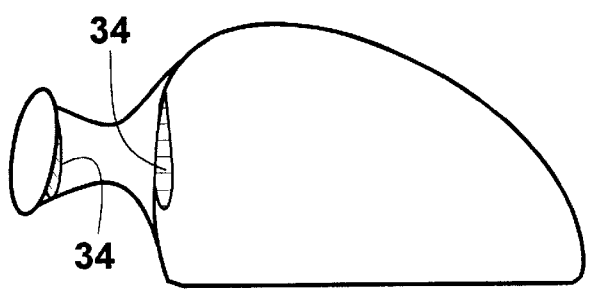
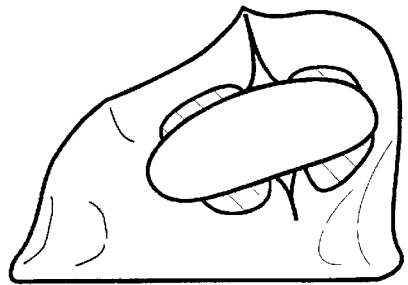
FIG. 14A          FIG. 14B

SAFE AND HANDY POINTING DEVICE

BACKGROUND

1. Field of Invention

The proposed invention relates generally to hand controllers or computer display pointing devices such as mouses, joysticks, and trackballs. More specifically, it relates to ergonomically shaped pointing devices, which eliminate harmful stresses in wrist and hand joints thus providing substantially improved functionality and prevent computer related injuries.

2. Description of Prior Art

The use of pointing devices for entering signals into a computer is well known in the art. Moreover, there is a great variety of so-called ergonomically shaped devices for this purpose. The most widely known devices can be represented by examples. U.S. Pat. No. 3,835,464 to Rider (1974) discloses a hand-operated position indicator for computer controlled display system. A hemispherical housing provides a plurality of buttons and a sphere located on a bottom structure supported on the underlying structure.

Basic functions of different mouses are very similar and remain about the same for a long time. Some common problems in the use of mouses are well known in the art. After a protracted period of continuous use, there is a muscle fatigue in a forearm, soreness, and even pain in the hand. In recent years, a medical problem formerly described as wrist level median nerve entrapment, but now commonly referred to as carpal tunnel syndrome (CTS) has taken on an ever-increasing significance, particularly in monetary payoffs by states for worker's compensation claims and by insurance companies for claims related to CTS surgery. The decease usually can not be treated well without a complete stop of use of the injured hand. By a definition of the American National Institute of Health "CTS occurs when tendons in the wrist become inflamed after being aggravated. A tunnel of bones and ligaments in the wrist narrows, pinching nerves that reach the fingers. Symptoms range from a burning, tingling numbness in the fingers, especially the thumb and the fore-and middle fingers, to difficulty gripping or making a fist. Approximately one percent of individuals with carpal tunnel syndrome develops permanent injury. The majority recover completely and can avoid re-injury by changing the way they do repetitive movements, the frequency with which they do the movements, and the amount of time they rest between periods when they perform the movements."

It is commonly believed that the cause of the decease is in that those pointing devices are not well shaped ergonomically to fit to the use's hand. Two common directions of improvements can be specified:

better accommodate pointing devices to the anatomical shape of a relaxed hand posture and to decrease bending of the forearm-wrist joint;

decrease a probability of inadvertent activation (pushing, clicking) of the control keys generating computer commands.

There are many patents issued for ergonomically shaped pointing devices improving their shape in a number of ways. U.S. Pat. No. 4,862,165 to Gart (1989) proposes an anatomical shape to fit the hand perfectly in order to avoid hand fatigue and discomfort after even a protracted period of use. This mouse is shaped so as to support the elevated palming position, support a thumb, support middle, ring, and small fingers in a relaxed wrapped position. However, the main operating forefinger is in a stretched and consequently stressed position above the push button. The user's forefinger can not relax unattended to avoid activation of a button. This is the main reason of static stress, because this mouse has no protection from unintentional activation.

U.S. Pat. No. 5,576,733 to Lo (1996) teaches that a conventional mouse requires constant muscular force to be applied to the hand, wrist, and forearm to maintain their positions twisted from neutral posture. For a three-button mouse, the fore-, middle-, and ring fingers must be kept in constant tension to prevent them from resting too heavily on the buttons and depressing them inadvertently. Lo teaches that the hand is about 80–90 degree twisted left from the normal upright position with a conventional mouse. Lo supposes that the best-relaxed position of the hand on the pointing device must be vertical upright keeping the fingers in a stack position to eliminate twisting of the hand.

However, the fingers controlling the buttons are all straightened, hence, contradicting the idea of the wrapped fingers typical for a relaxed hand. Moreover, the vertical upright position is optimal for only a hand, which elbow is very close to the user's body. It is not so relaxed, when the elbow is distant from the body as in a usual situation, when the computer keyboard is in front of a user. It is easy to understand imaging a pistol grip in hand: when the elbow is squeezed to the body, then the grip is about vertical. When the elbow moved away from the body, the grip becomes substantially horizontal. Consequently, the hand on a mouse must not be turned upright too much to be vertical: it is not anatomical and, hence, limits the hand functionality. It is especially true, when the hand is operating a mouse at the desktop edge. Besides, this mouse substantially limits finger functionality.

U.S. Pat. No. 5,355,147 to Lear (1994) proposes a vertical mouse structure with a palm-wrist support. The activator switches or push-buttons are designed to be pressed by the thumb and the bent fingers wrapping a vertical grip. This mouse provides as good functionality for the fingers as any other pointing device of the type known as joystick. It is also protected from unintentional button activation in the same way as other joystick-type pointing devices. However, this device is cumbersome in comparison with conventional mouses and does not provide a possibility of using the wrist and finger functionality for fine positioning. Besides, it is rather difficult for computer users to change usual function of the middle finger to the thumb.

One more example is a well-known highly operable pistol grip. It provides at least two important functions simultaneously: a firm grip and a gentle relaxed position for the operating forefinger pulling a trigger. Pistol grips are very functional in both senses. Such grips used to be optimal for vertical controllers. They are widely used as vertical joystick devices. Such kind of grips is substantially protected from unintentional activation. In a vertical grip, the axis of rotation/bending of the forefinger is vertical. The finger can be kept standby in this position as long as needed without any power applied. Hence, there is no specific stress in the hand, which is typical for all horizontally operating mouses.

U.S. Pat. No. 5,296,871 to Paley (1994) claims a three-dimensional mouse operating in free space. This pointing device is designed essentially as a pistol grip including a thumb push button, a forefinger push button, and a grip push button. Paley has mentioned that such grips are substantially free from a danger of unintentional activation. Consequently, they can be recognized as safe grips: they don't induce the static tension in a hand and a stress in the user's brain from the necessity to continuously control the command fingers. On the other hand, these grips are safe, because they are essentially protected from generating erroneous command. That is why such grips are widely used in mission critical applications including weapon control. However, they need some constant efforts to just be held in hands.

Unfortunately, pointing devices of this kind is difficult to use on a desktop surface in comparison with conventional mouses. That is why the ergonomic mouse by Gart is not safe and has the same drawback as other conventional mouses. It was shaped essentially similar in some respect to an orthopedic pistol grip and adapted for use on a horizontal surface. That is the operating forefinger pulling the pistol trigger bends in horizontal but not in vertical plane. While it is in relaxed position in a pistol grip, it can not be relaxed with such grip in horizontal position to avoid an inadvertent action onto the underlying push button actuators. The axis of rotation is changed from vertical to horizontal, hence, the finger is affected by its own weight. It must be supported by a price of constant tension and compressed wrist joint. The static tension in operating fingers and, consequently, in the hand and wrist joint and forearm muscles is the main problem of all currently used horizontal pointing devices including trackballs. Namely this unnatural tension produces hard pain in the hand and limits functionality of all mouses and trackballs. This problem is a main source of injuries generated by pointing devices operating on a horizontal surface.

The most recent patents on pointing devices repeat similar idea about further improvement of the shape of pointing devices not modifying substantially their functionality. Hence, the harmful tension persists in the user's hand. More and more users become the victims of computer generated injuries. Similar future can be predicted for their children, unless a safe horizontal pointing device will be produced.

U.S. Pat. No. 5,726,683 to Goldstein (1998) claims an ergonomic computer mouse keeping the hand slightly elevated and upright. These ideas yet not combined have been described in U.S. Pat. No. 5,581,277 to Tajiri (1996) with elevated palm support, and in U.S. Pat. No. 5,576,733 to Lo (1996) with the upright mouse. The most cited patent to Gart also describes substantially elevated shape of the pointing device. The slope of the push-button surface of the pointing device by Goldstein is increased from usual 0–20 degree up to about 30–40 degree in average relative to a horizon. However, the slope of the buttons is yet essentially horizontal in average. The projection of the front push buttons (front actuators) on a horizontal plane is bigger then on a vertical plane. It is still very similar to the slope of conventional mouses and, hence, very close to them in fimctionality (for example, the MK mouse produced some years ago by WACHI Electronics Co. for NEC computers, Japan). The critical threshold of the downward force capable to click the button is determined by a minimurn, not maximum or average, slope of the front button. Indeed, any buttons having a substantially horizontal portion are not protected from inadvertent activation by a heavily loaded hand and fingers. Hence, this mouse is not safe, because the user must be in constant stress to avoid inadvertent button activation by the unattended hand.

The mouse designed by Goldstein has a special side support for the forefinger. The support is made nearby the button. The finger can be moved there to rest between clicking operations. Then it must be repositioned to the button in order to perform another click. Obviously, such repositioning is not of practical use during continuous operation. It damages the overall functionality. The authors of that patent were certainly aware of the problem of constant tension caused by the stressed forefinger, but failed to solve it. Even mouses with essentially elevated top surface, like those patented by Gart, by Goldstein, or the MK mouse by WACHI Electronics, do not free a hand from the stress generated in a wrist by the constant danger of unintentional activation.

Some non-patented pointing devices of original design can be found in the computer market. They are not protected from unintentional activation of the switching buttons. Consequently, all users are brought into continuous stress and especially those, who work with large spreadsheets, office, CAD and drawing software, dynamic games etc. The higher a psychological risk of inadvertent clicking of the actuators, the stronger is the wrist stressed. This constant stress inevitably affects user's central nervous system and a very fragile carpal tunnel protecting the nerves controlling the hand and fingers. This protracted non-anatomical effort, keeping the fingers away from the switching buttons, injures the wrist carpals. At the final stage, any user is at high risk of organic transformations in the wrist and chronic musculoskeletal diseases.

The above mentioned examples show that the prior art patents are concentrated basically on a static position of the hand and fingers. Many of previous art mouses, for example the one designed by Gart, fit a hand very well. An average user with a healthy hand and wrist joint can hardly distinguish between unsafe and safer mouses not having used them long enough. Any attempt to compare the functionality of different mouses by measuring electric potentials on the hand muscles (U.S. Pat. No. 5,726,683) without well-approved dynamic medical schemes and reasonable statistics is doubtful.

In order to summarize main drawbacks of the previous art and come to conclusion, we shall consider some basic principles of anatomical functions of a human hand, which can show a way to the right functionality.

Some Biomedical Considerations

Many mechanical medical devices for treatment of the carpal tunnel syndrome are patented. These devices are designed for healing an injured wrist by means of stretching it in a direction away from the elbow and are described in the U.S. Pat. No. 5,653,678 (1997) and U.S. Pat. No. 5,707,345 (1998) to Fulk, U.S. Pat. No. 5,466,215 to Lair (1995), U.S. Pat. No. 5,214,799 to Fabry (1993) etc.

Tendons connected to forearm muscles control a hand and fingers. The strongest muscles of the forearm, called flexors, bend the fingers into a wrapped position or a fist. This is the strongest and safe hand position for powerful actions. Since all tendons pulling the fingers go across the wrist, they inevitably compress the wrist joint. Hence, the carpals come into heavily loaded contacts. However, it is not dangerous. These contacts are naturally protected by thick cartilage tissues and designed for periodic heavy loads and intensive use. The stretching of joints is useful and healing, while their compressing, even being anatomical, can be harmful depending on the magnitude of the pressure and its duration.

When the job is finished, the initially stressed flexor muscles relax. Then different essentially weaker muscles of the forearm, called extensors, pull opposite tendons of the fingers in order to open the fist and prepare it for the next catch-and-keep job. There is no other job supposed to be for such unbending tendons except of short-time weakly loaded moves. Everybody knows, for example, how difficult it is to keep arms up for even a minute. It is anatomically unnatural, and therefore, stressful position. The same is correct about the hand and fingers. Any long time not supported posture keeping fingers over a horizontal plane even a little bit unbent outwardly is harmful. Watching users' hands operating mouses, one can distinguish that the fore- and middle fingers are usually a little bit up above the sensitive actuators, especially when mission critical operations are running.

Consequently, previous art mouses were designed to be ergonomic for the short moments of clicking actions. However, they all are not ergonomic and even dangerous (unsafe) for the longest rest periods occupying more than about 90 percents of the total operating time, when the hand is resting on the mouse in a stressed position to avoid unintentional activation. These protracted periods of stressful anatomically unnatural position of the user's hand is still a major problem of the prior art.

OBJECTS AND ADVANTAGES

This is a paradox, but in fact the user's hand becomes tired and even injured not from the active job, but due to the protracted unnatural and stressful "rest". This problem well recognized in the present invention shows itself the only way to cardinally improve pointing devices. It is, therefore, necessary to exclude a possibility of inadvertent activation of the push-buttons by a relaxed user's hand. Only in such case, the wrist joint can be at real safe rest between the clicking operations, and the user will be free from specific tensions and stresses, and consequently, from the hand injuries and pain.

Accordingly, the main objects of the present invention are:

(a) to provide safe pointing devices protected from unintentional activation by a relaxed user's hand;

(b) to provide a pointing device on which a relaxed user's hand enjoys full rest all the time between the moments of activation of switch buttons being in a highly operable position;

(c) to provide a pointing device with essentially improved functionality for a protracted period of continuous use;

(d) to provide a pointing device, which can be grasped by a hand with all the fingers bent and wrapped into a highly operable and comfortable posture;

(e) to provide a pointing device, where the command fingers can fine touch the command keys and be ready for immediate action without a risk of unintentional activation;

(f) to provide a pointing device gently stretching a hand wrist when a user's hand is relaxed thus protecting the wrist joint from being strained, aggravated, and injured;

(g) to provide a pointing device, which is functional in a range of conditions: on a wide desktop surface or at the very edge of the desk;

(h) to provide a handy and safe pointing device having additional functionality for scrolling, cursor positioning, menu activation, etc.

(i) to provide safe pointing device adopting any comfortable hand supporting housing by the use of actuators for unbending finger actions;

(i) to provide convenient and safe pointing devices for disabled persons.

Further objects and advantages are to provide a variety of pointing devices based on the same design rules and adopted for particular cases and additional functions. These advantages will become apparent from a consideration of the drawings and ensuing description.

DRAWING FIGURES

FIGS. 1A to 1C show left, front, and topside views of one embodiment of the safe and handy pointing device.

FIG. 12 is a left side view of the device with "-Y" directed push-buttons.

FIG. 13 is a left side view of the device with "X,-Y" directed push-buttons.

FIGS. 14A and 14B show left and front side views of the device with "X" directed push buttons.

Figure 1C:
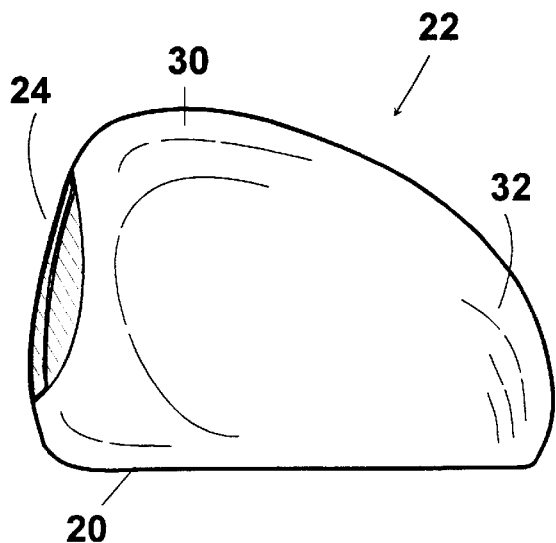
Figure 1C:
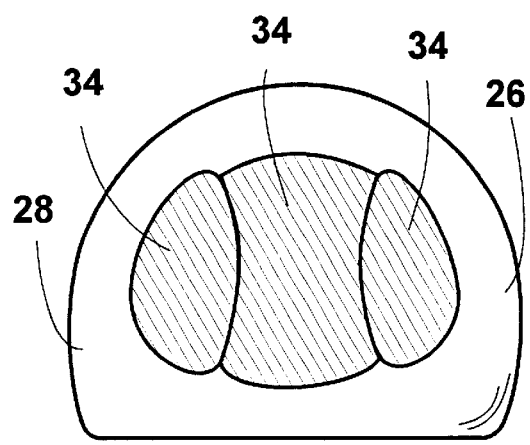
Figure 1C:
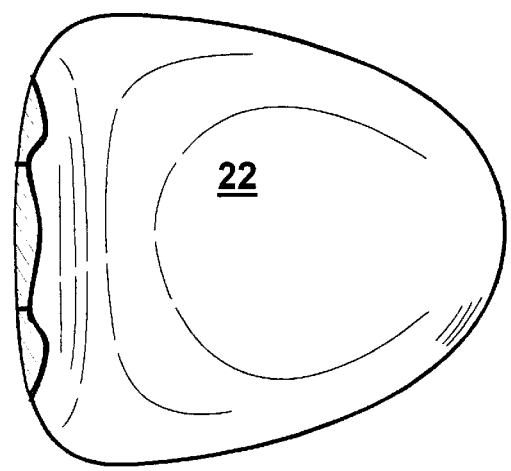

| REFERENCE NUMERALS IN DRAWING | |
|---|---|
| 20 | bottom |
| 22 | housing shell |
| 24 | front surface |
| 26 | left surface |
| 28 | right surface |
| 30 | top surface |
| 32 | rear surface |
| 34 | front push buttons |
| 36 | depression for a forefinger |
| 38 | depression for a middle finger |
| 40 | depression for a ring finger |
| 42 | a ridge between a fore- and middle finger |
| 44 | ridge between fore- and ring fingers |
| 46 | depression for a thumb |
| 48 | depression for a small finger |
| 50 | depression for a middle metacarpal joint |
| 52 | projection for a small finger |
| 54 | functional actuator for a thumb |
| 56 | location of a pisiform carpal bone |
| 58 | depression for a pisiform |
| 60 | rounded projection for a thumb |
| 62 | supporting plastic spring |
| 64 | push-button actuator |

SUMMARY

In accordance with the present invention a handy and safe pointing device comprises a flat bottom, generally convex housing shell attached on top of the bottom, means for controlling a cursor position, a plurality of actuators for generating computer input signals, at least one to three, and preferably two of which are mounted at a front side, the front side actuators being designed to be activated by finger moves or pressure directed substantially horizontally or vertically upward, the front side actuators being further designed to be protected from actuation by a substantially vertical downward force.

DETAILED DESCRIPTION OF THE INVENTION

A principal concept of the present invention is to protect the push buttons of pointing devices from involuntary activation by the user's unattended relaxed hand and fingers.

The design concept protecting the push-button actuators can adopt bending and/or unbending action of the operating fore-, middle-, and ring finger. Obviously, the buttons are 100% protected from the downward load in the case they are faced horizontally or vertically downward. We consider here the flat buttons for simplicity. However, it is understood that their shape can be convex, concave, or more complicated. It does not substantially change the nature of their function.

Pointing devices of the present invention consists of a generally convex housing enclosing an underlying planar support surface. The housing can be characterized as having a plurality of distinct hand supporting surfaces each shaped to accommodate support of distinct portion of the hand in an ergonomically comfortable and highly functional position. A plurality of specific housings can be provided for different groups of the users. That is for the users who like more or less stretches finger posture or a capped like fist hand position. Hands of different shape and size can be accommodated; different working conditions can also be satisfied. Two general housing shapes can be opposed each other. One is a low profile, about 2–3 centimeter high housing keeping the fingers substantially stretched forward. This is a shape of conventional mouses. Another shape is higher, about 3.5–6.5 centimeter high, having substantially steep front surface. It has characteristic dimensions and shape suitable to be firmly grasped by all fingers, as it would be a half-egg shell with a cut blunt end. Push buttons are mounted at the blunt end.

This plurality of different housings can be used with the same design concept of the protected push-button actuators. The buttons of the pointing device are always adjacent to the front surface, where the fore-, middle-, and ring are resting ready for clicks. These buttons are to be sensitive to only substantially vertical upward or horizontal finger moves. They are not sensitive to the downward vertical finger moves, downward load, pressure, or forces because they are faced horizontally or substantially vertically downward.

In the case of low profile housings, the buttons are adopted for unbending finger moves. That is the buttons are opposed to and faced to the housing. The user's fingers are resting on the housing front/top surface between the housing and the buttons. The buttons are activated by the unbending upward finger moves.

Certainly, the protection function can be implemented in the switch design. For instance, substantially horizontal push-buttons of conventional mouses mounted on the front/top surface of the housing can be converted into horizontally sliding buttons. Such "pull buttons" work more like a pistol trigger and are not sensitive for vertical downward loads. They can move only horizontally thus activating signal switches or sensors. Scratching-like finger moves can activate such switches. Certainly, special groves and patterning of the button surface can be used in order to improve switching function and make it comfortable.

In the case of high-profile housing shells with substantially wrapped finger grips, the front surface carrying the push-button actuators is essentially vertical. Hence, the buttons are faced substantially horizontally. In this case, they are not sensitive for any downward loads. It is certainly true for the buttons having more than vertical slopes. More gently sloping front surfaces can use the buttons with substantially prohibited vertical activation like the above-described sliding switches of low profile housings.

Therefore, the safe pointing devices can be generally described as having the front side or front actuators sensitive for substantially horizontal and vertical upward finger moves. The front actuators are not sensitive for substantially downward loads like those generated by the relaxed hand and fingers. All and any of such devices are safe in terms of the wrist-stress prohibitive function. The user's hand can rest on the safe pointing devices without a risk of inadvertent activation of its command actuators. This is the main function of the safe pointing device of the present invention.

The housing shell consists of contiguous surfaces, which can be defined as a front surface, top surface, rear surface, left and right side surfaces. However, it is rather difficult to define their boundaries in case the housing shell is very close to the shape of spherical segment. Therefore, strict distinction between the front and top surfaces becomes especially indefinite in the case of low profile housings: all the surfaces become eventually the top surface having just corresponding front, rear, and side edges or portions. It is therefore understood that a front portion of the top surface can be mentioned as the front surface. Same remarks cab be made concerning the side and rear surfaces.

It is understood that the housing shell itself must be ergonomically designed to be as well comfortable and handy. Therefore, a plurality of safe designs of the front actuators combined with a plurality of comfortable and handy housing shells provides the handy and safe pointing devices. Several embodiments are presented here. It is understood that many more safe and handy pointing devices can be developed following the design concepts of the present invention.

The particular preferred embodiments of the invention shown in the accompanying figures and described herein are configured mainly for use with the right hand. However, it will be understood that they can readily be configured for use with the left hand by simply providing a mirror image version of the right hand configuration.

A basic safe pointing device of the present invention is shown in FIGS. 1A to 1C. The device consists of a generally flat bottom 20 positioned on an underlying supporting surface and a generally convex housing 22 attached on top of the bottom, where conventional hardware mechanism is enclosed (not shown). The housing shell has a substantially vertical front surface 24, a left side surface 26, and a right side surface 28. A top surface 30 is about 38–67 and preferably about 52 mm high at the top front edge. This surface is contiguous with a rounded rear surface 32. A total length is about 60–90 mm, and width is about 50–85 mm. Such dimensions are favorable for a compact and firmly wrapped grip for hands of different size.

At least one, two, or three actuators 34 are mounted on the front surface. These actuators can be made as usual mechanical clicking push-buttons, pressure or force sensors. The front actuators are protected from unintentional activation by a heavily loaded unattended user's hand and fingers. This goal is achieved in the present embodiment by the substantial steepness of the front actuators, which are sensitive to horizontal loads, and are not sensitive to any vertical forces or finger moves. Naturally, the front buttons must be designed in order to transfer the horizontal finger pressure onto electrical switches or sensors.

The top surface supports about horizontally the fore-, middle, and ring fingers' proximal phalanges of the user's hand. Hence,- middle and distal phalanges deviate from, for example, strictly vertical front surface keeping the distal finger pads well away from the buttons. Thus the slope of the front surface actuators can be decreased up to about 50–60 degree (depending on the shape of the top- surface supporting about horizontally the proximal phalanges of fore-, middle, and ring fingers) relative to the bottom without a risk of substantially increasing the load on the push buttons from the relaxed (unattended) fingers. However, the steeper vertical slopes of the front surface are preferable for the safe grips. Therefore, the range of useful slopes of the front surface here can be about 50–130 degree relative to the bottom, and preferably about 76–108 degree. The cross-sectional dimensions of the device are designed in order to provide the completely wrapped grip with all fingers substantially bent on the housing shell. The palm heel is standing on the underlying surface during operation. Three front fingertips, distal pads, do not contact the underlying surface. The grip is highly functional. It is similar to the relaxed fist posture. It provides fine finger functionality.

The top surface is substantially higher than that of conventional mouses. Hence, the metacarpal joints of the fore-, middle, and ring fingers are substantially elevated over the underlying surface. It must be well understood that this elevation stretches the wrist-forearm joint thus essentially unloading an inter-carpal contact pressure. This support is different by nature from the stressful elevation of the self-supported user's hand over conventional mouses generated by the user's own muscles and tendons. The majority of the users of conventional mouses keep the operating fingers well above a mouse to prevent the fingers from heavy loading the buttons. This makes a great difference in medical consequences of similar postures generated by different means: an external support or strained hand tendons. The last produces continues compressive loads on the wrist joint and, hence, carpal bones.

This can be explained by an example. It is the same difference between the two hereinbefore described postures as between two persons lying in a bed. Suppose, one is keeping his head free about 10 cm above the bed surface, another is keeping his head on a pillow 10 cm above the bed. One has a stressful and painful neck, another may have a relaxed comfortable sleep.

The stretching action generated in the wrist-forearm joint by the high housing shell is similar to that of medical mechanical devices used for the treatment of carpal tunnel syndrome and other wrist injuries. That is this stretching mechanical action is medically approved rendering healing effect to a wrist. The high elevation has important merit for operation on a limited desk area near the very edge when the elbow is at about the same level as the desk surface or below it. The device can be used by righties and lefties.

Figure 2A:
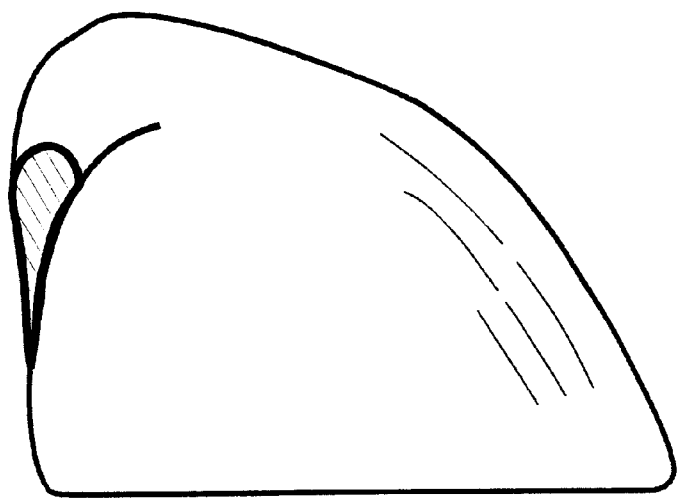
FIGS. 2A and 2B show left and front side views of the device with depressions for fingers.
Figure 2B:
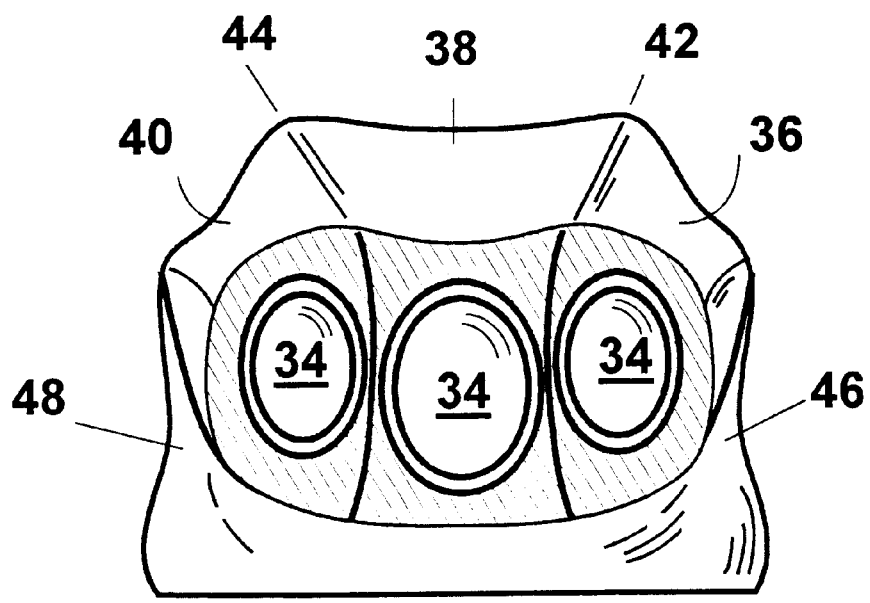
Figure 3A:
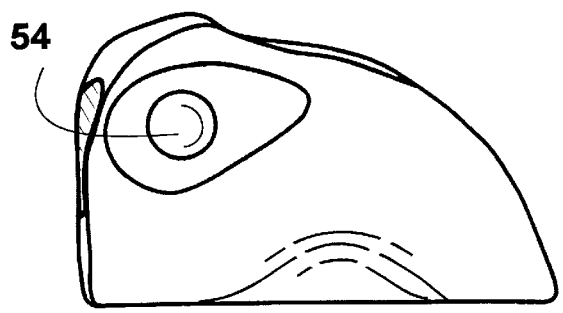
FIGS. 3A to 3F show left, front, top, right, rear, and bottom side views of the comfortable device.
Figure 3B:
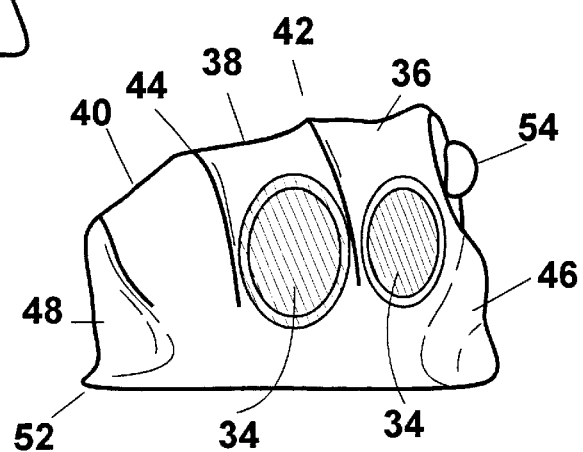
Figure 3C:
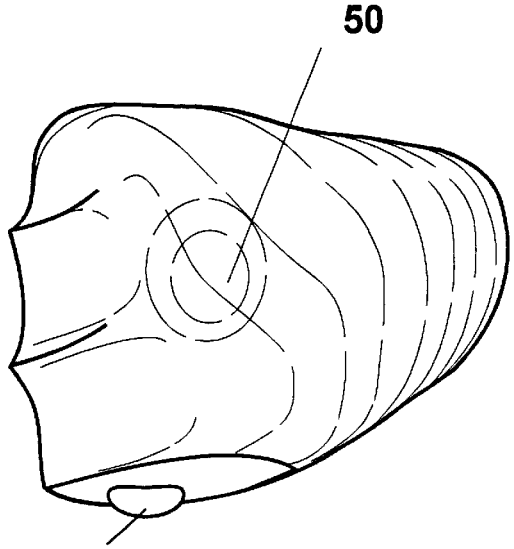
Figure 3D:
Figure 3E:
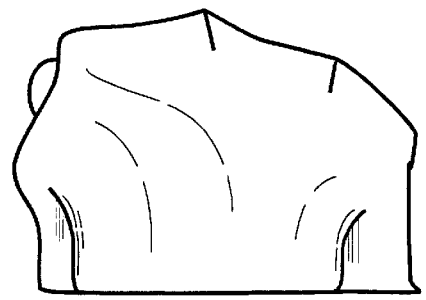
Figure 3F:
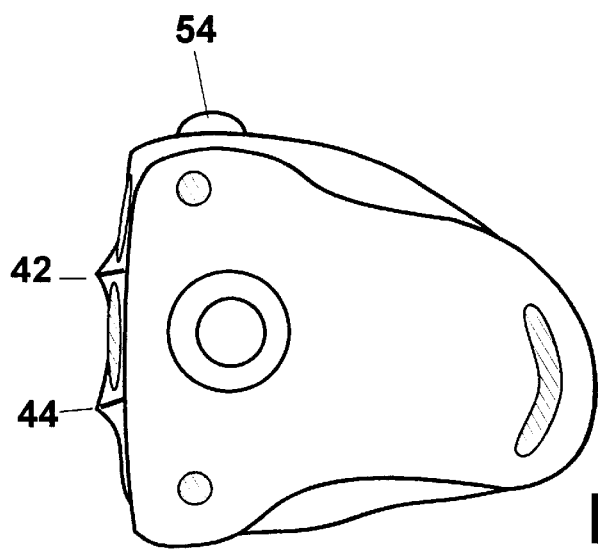

FIGS. 2A and 2B shows further improvements of the basic device. Concave depressions 36, 38, 40 on the top surface are made to position the fore-, middle, and ring finger proximal phalanges, correspondingly. Ridges 42, 44 separate the fingers and direct them to the buttons. There are also two concave depressions 46, 48 for the thumb and small fingers. The front surface is made about vertical for a stronger grip. The device can be used by righties and lefties.

The next essential improvement is to create more orthopedic and comfortable device. FIGS. 3A to 3F show six views of the proposed embodiment. The housing keeps the hand slightly upright. It has about 20–60 and preferably about 28 percents lower right side in comparison with the left side. The lower right side provides more anatomical hand position for those users, who keep the elbow close to the body during operation. However, too much upright hand posture, e.g. more than about 60 percent lower right side, damages fine finger functionality. Ridge 42 between the fore- and middle finger is made more distinct. It exactly positions the fore- and middle fingers on the shell even for different size hands. The ring finger depression on the top surface is transformed into about 40–50 degree inclined slightly convex rounded surface well fitting different hands. The top surface is noticeably extended to the rear thus becoming flatter. There is also a predetermined concave depression 50 in the top surface to receive the middle metacarpal joint. Its center is about 30–35 mm from the front edge. This depression essentially decreases the supporting pressure on the biggest middle finger metacarpal joint. Therefore, the supporting force is distributed around a wider area of surrounding soft volar tissues. Hence, the pressure on the joint is substantially decreased giving more comfortable and relaxed grip. Depression 48 for the small finger has a bottom projection 52 to support the tip of small finger and protect it from touching the underlying surface.

The narrow rear end of the shell is slightly pivoting to the right (FIG. 3C—a top view) thus coming into the middle of the volar heel between the thumb and anterior volar pads.

An additional thumb actuator 54 is mounted on top of the left side surface. This functional actuator can be made as a ball-shaped positioning sensor, scrolling wheel, joystick, pressure or movement sensor, switch, push-button, drag-lock button, or somehow customized depending on special needs. It can be used for such functions as cursor positioning, scrolling, sensitivity or menu switching, and so on. The ridge between fore- and middle fingers can be also made as a narrow scrolling wheel or any other additional functional switch or sensor. The control buttons, sensors can be configurable by software drivers.

Figure 4A:
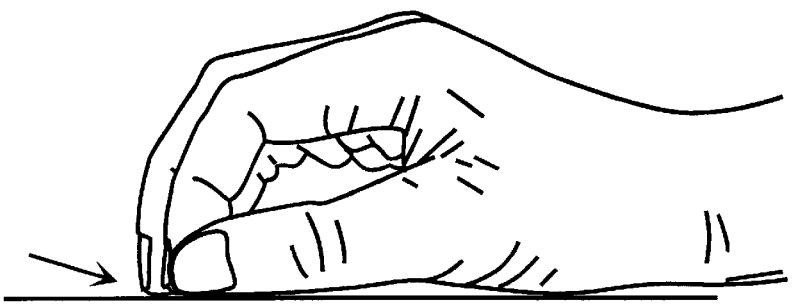
FIG. 4A is a left side view of a free hand on a horizontal surface.
Figure 4B:
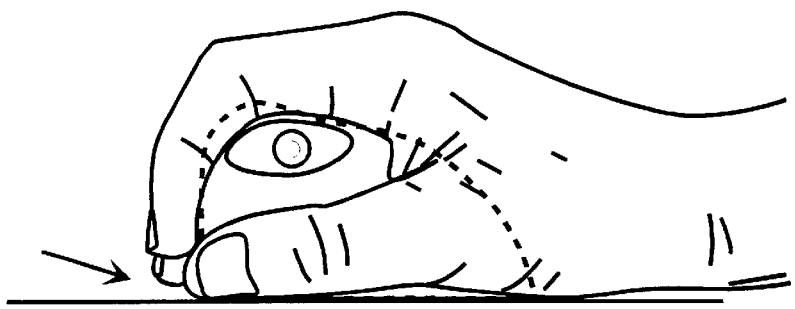
FIG. 4B is a left side view of a hand grasping the pointing device of the present invention.

A relaxed hand with all fingers bent and touching the underlying horizontal surface as shown by an arrow is shown in FIG. 4A. FIG; 4B shows the same hand grasping the safe pointing device of FIGS. 3A to 3F. The front fingers are noticeably elevated over the underlying surface as indicated by an arrow. It is thus understood that the device is designed to fill in the space between the hand and underlying surface.

Figure 5:
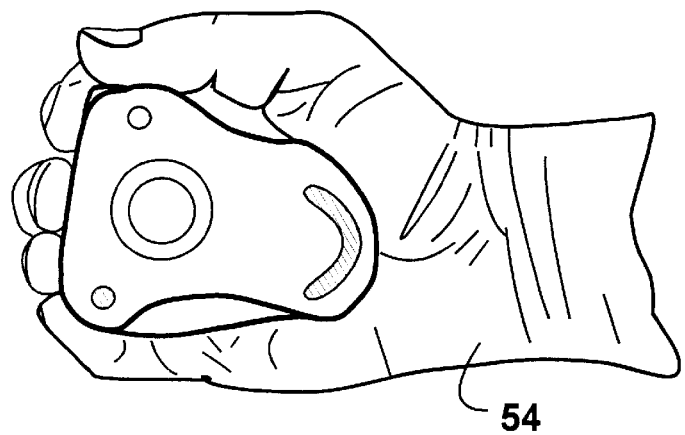
FIG. 5 is a bottom side view of a hand grasping the comfortable device.

FIG. 5 shows a bottom view of the gripped device. It is well seen that the grip is essentially anatomical and secure.

Figure 6A:
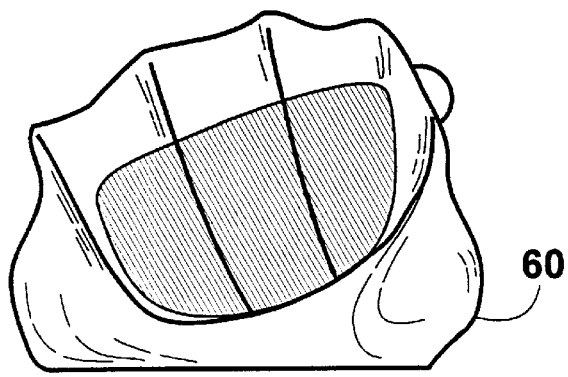
FIGS. 6A to 6C show front, left, and top side views of the device with a wrist support
Figure 6B:
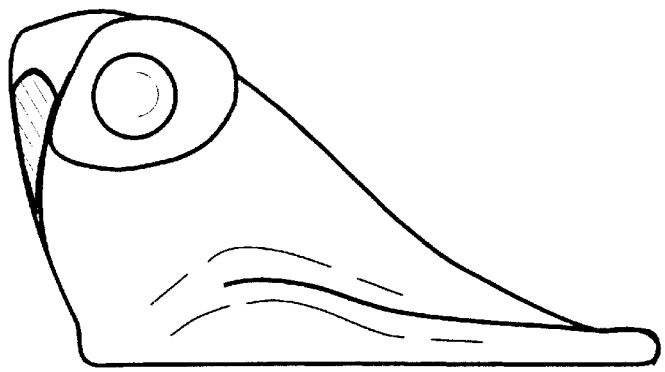
Figure 6C:
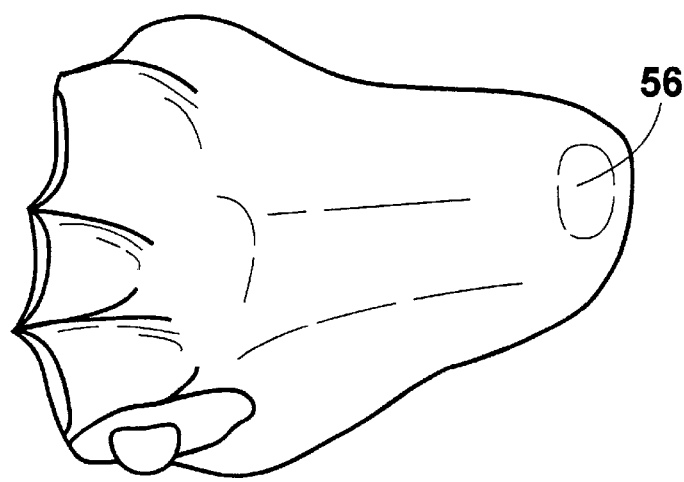

The next improvement introduces an embodiment having a support 46 for the wrist-forearm joint as shown in FIGS. 6A to 6C. The supporting surface representing a smooth rear bottom projection. The supporting surface projects in the direction to the small carpal bone called pisiform, located as shown in FIG. 6C.

This small bone is usually heavily contacting the underlying surface during mouses operations and can be aggravated and painful. Therefore, the supporting surface has a predetermined depression 56 adopting the pisiform thus redistributing the pressure to the surrounding soft volar tissues. The support is made narrow enough to not limit the finger functionality.

The thumb depression on the left side is combined with a rounded projection 60 giving a possibility to vary the grip from wider to narrower during operation. It also adopts hands of different sizes.

Figure 7A:
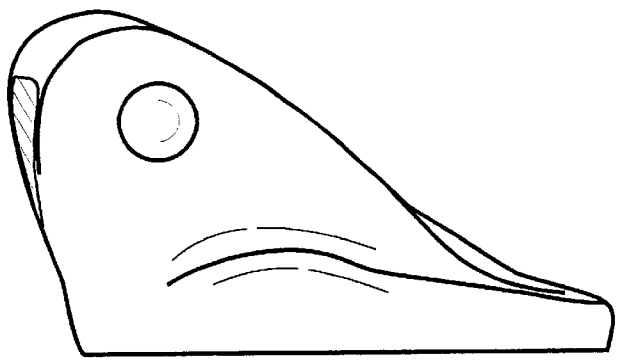
FIGS. 7A to 7C show left, front, and top side views of the device with a wide wrist support and narrow grip.
Figure 7B:
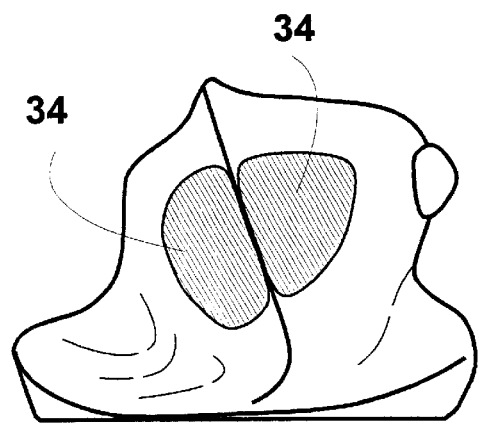
Figure 7C:
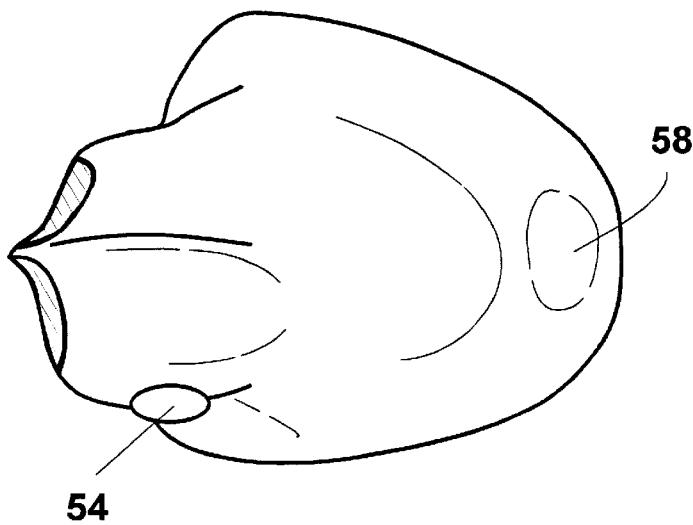

The front surface has more than vertical about 105–130 and preferably about 110-degree average slope relative to the bottom. It provides a firm grip close to the most operable but relaxed fist shape. The device is especially functional for extraordinarily long periods of continuous use in mission critical applications. For example, it can be adopted for stressful jobs dealing with fast pattern recognition over the high level of noise; to control an immediate fire on unexpectedly appearing seldom targets; to precisely control fine positioning of objects, etc., One more embodiment of the present invention with a wrist support is shown in FIGS. 7A to 7C. Here the support is made wider and higher edges in comparison with the device shown in FIGS. 3A to 3C. This improvement distributes the supporting pressure over a wider palm area thus substantially decreasing the load on the middle and forefingers. The depressions for the ring and small fingers are transformed into a single rounded surface thus better adopting hands with different sizes. This device, being adapted to work on a horizontal surface, is somewhat similar to vertical joystick devices.

It provides comfortable and safe grip for one and two click-button modifications. Besides, it can be used as a trackball for disabled persons. In such case, the device can be gently attached to the hand by a soft band, plastic hook, or a hook-and-loop stripe. The thumb functional actuator can be used for cursor positioning.

Alternatively, a mouse pad can be attached to a chair, bed, hip, or even a belly. The safety mouse does not need constant tension in the hand to avoid inadvertent activation. Thus, the user's hand is relaxed all the time but the clicking moments. Consequently, this device does not disturb physical condition of a user.

Figure 8A:
FIGS. 8A to 8C is a left, front, and top side view of a portable handy device.
Figure 8B:
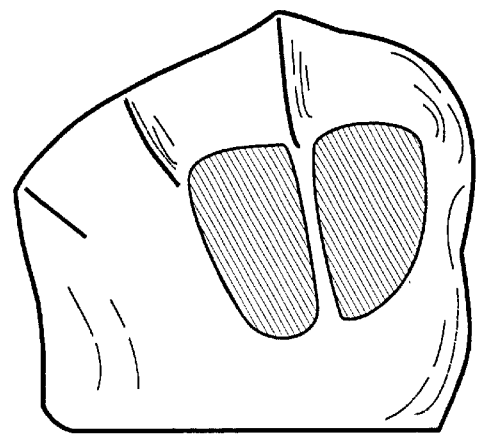
Figure 8C:
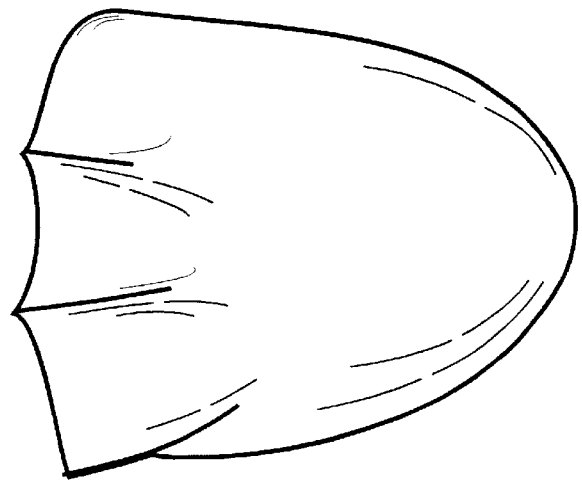
Figure 9A:
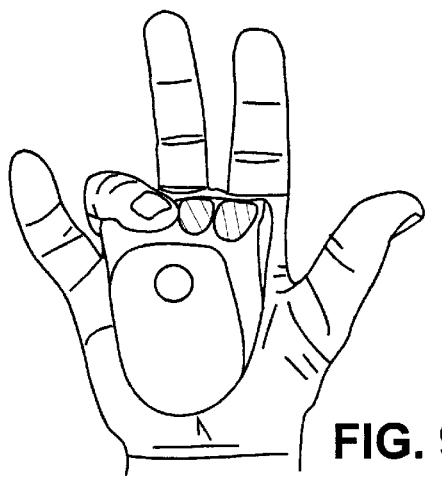
FIGS. 9A–9F is bottom views of a hand grasping the portable handy device by different fingers.
Figure 9B:
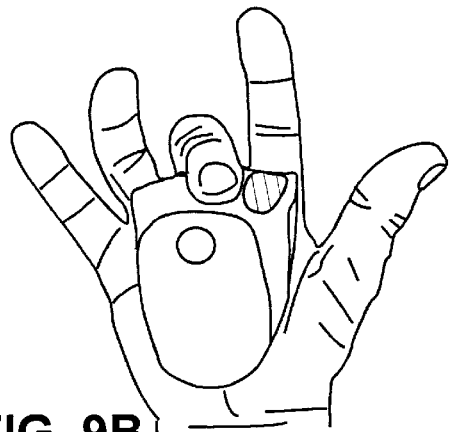
Figure 9C:
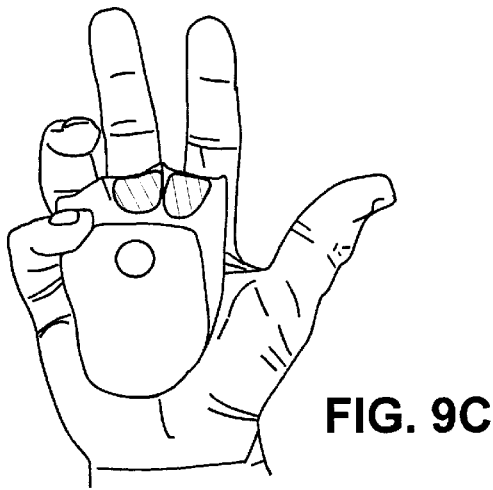
Figure 9D:
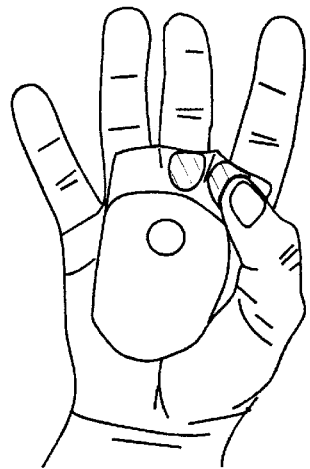
Figure 9E:
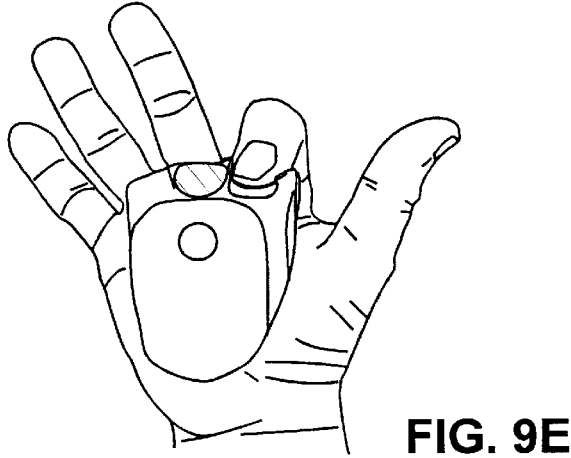
Figure 9F:
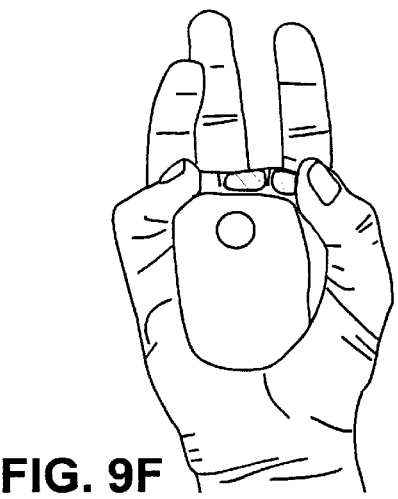

The next embodiment is shown in FIGS. 8A to 8C. This is a safe and highly operable compact device. It has narrower and shorter bottom in comparison with the previously described embodiments and higher and smaller top surface than that of the device shown in FIG. 3A. The front surface slope is about 95–125 and preferably about 115 degree relative to the bottom. An ergonomic shape of the present device is very handy: the device can even be grasped by any single finger and is functional in free space as shown in FIGS. 9A to 9D. These figures help to better understand the anatomical shape of the device.

This safe and handy embodiment is useful for especially intensive and precise applications. The high top surface substantially stretches the wrist joint from the elbow, when the forearm is positioned on the desktop surface. It provides additional protecting and healing effects on the wrist joint and carpal contacts.

This embodiment is about 10–25 percents narrower, shorter, and higher than the embodiment shown in FIGS. 3A–3F. The bottom portion is additionally shrunk in order to handy grasp the shell by the wrapped thumb and small finger. The elevated top surface keeps the three front fingers above them. Therefore, this embodiment provides a wide range for finger functionality. It is especially convenient for laptop computer users allowing them operation on virtually any surface with substantially limited area. The device is highly functional and convenient on a large flat surface, when either finger or forearm moves can be used to control the cursor position. However, finger and wrist functionality is especially improved and becomes substantially more comfortable at the desktop edge in comparison with conventional mouses.

The embodiments shown in FIGS. 1A–9D represent only a part of the devices based on the concept of safe stress-protected pointing devices with bending finger horizontal moves.

Figure 10:
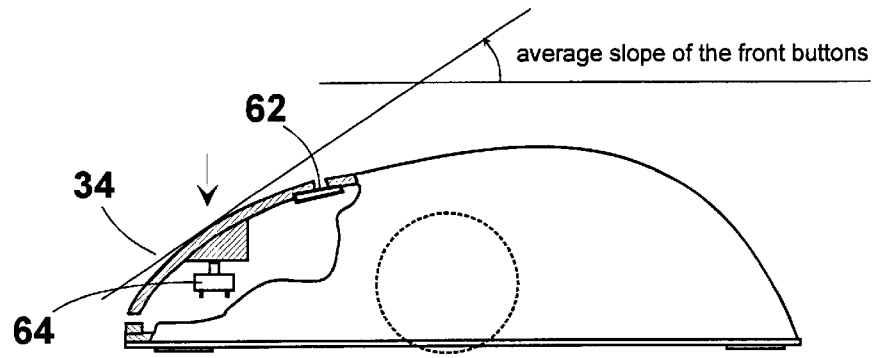
FIG. 10 is partial cross-section of a prior art mouse at the push-button location.
Figure 11:
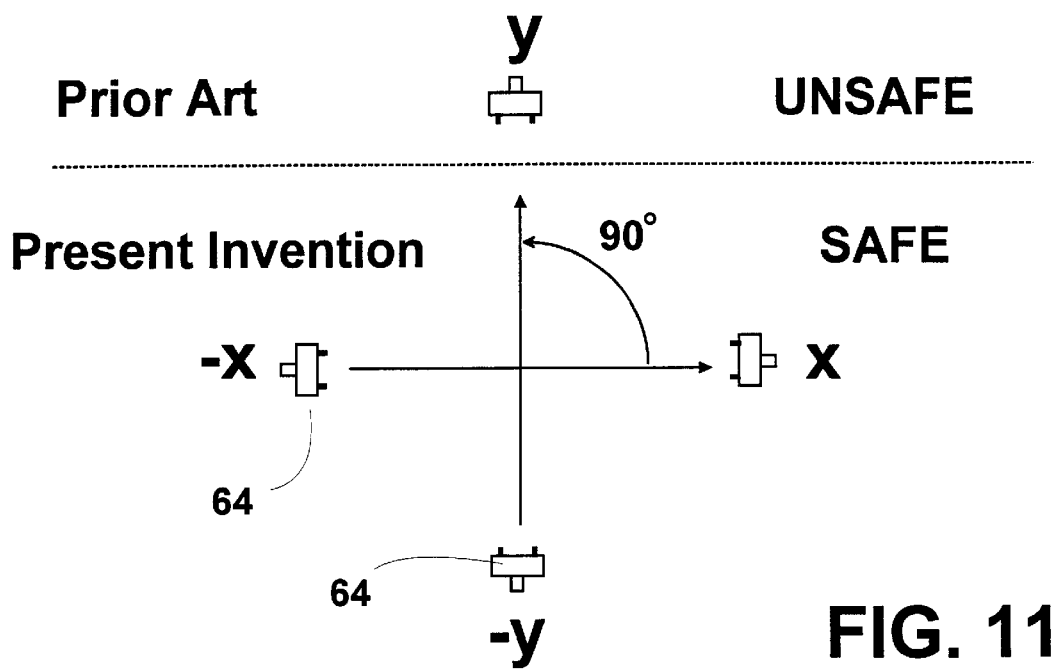
FIG. 11 is a schematic view of orientations of the front push-button switches.

FIG. 10A shows a partial left side cross-sectional view of a prior art mouse. Here a front push button, mounted on the housing shell by a flexible plastic spring 62, presses a switch 64 under the vertical downward finger action thus generating a computer input signal. FIG. 11 shows four unidirectional switches oriented in four directions denoted as "X", "Y", "-X", and "-Y". Conventional mouses use the "Y" directed switches, which are not protected, but specially designed for the vertical downward activating force. The present invention includes the configurations protected from activation by a vertical downward force. It does not include the configurations sensitive to the downward loads. Hence, the "-X", "-Y", "X", and all intermediately directed switches are used in the safe devices by the present invention. It must be understood that this explanation is presented here in order to show a simplified concept of the present invention. It does not limit a variety of switching devices and sensors used in the safe pointing devices to generate computer input signals. It is clear that any unidirectional switch can be adopted to sense a pressure from any direction by intermediate means transforming the direction of the applied force. It is also understood that any actuators, which satisfy the protecting function of the present concept, can be used. Moreover, the level of protection and safety is determined not solely by the orientation of the switches or sensors. It is determined by both switches and push buttons in combination. Substantially vertical buttons beginning from about 50–60 degree minimum inclination in respect to the bottom (see FIGS. 1A–9D) can hardly be activated by a relaxed hand and fingers, and therefore are substantially protected. Consequently, the limits of the protected range of directions of the push buttons have a wider range than that shown for the sake of simplicity in FIG. 11. It covers also some orientations between the Y and -X directions as described in the particular embodiments. The protected configurations are those determined as being protected from downward loads. Moreover, the horizontally sliding design of the front buttons prohibits any vertical activation thus substantially expanding the range of protected slopes up to zero degree, that is horizontal. In other words, the slope of the front actuators itself has no limitation on the safe function of the present invention. Protected from vertical activation, horizontal actuators work as sliding switches usually having some roughness, ridges, or grooves on their surface to facilitate friction between the surface of the sliding button and the user's finger.

There are many particular embodiments, covered by the present invention, which are not shown explicitly in the specification. For example, the embodiments shown in FIGS. 12 to 14A use the protected configurations generally based on the "X" and "-Y" directed switches shown in FIG. 11. These embodiments are also protected from activation by the vertical downward load of the relaxed hand and fingers. The clicking fingers move here in a direction opposite to the commonly accepted. The common way of actuating clicks is generated by the fingers pulled by flexor muscles and tendons. Here, extensor muscles and tendons unbend fingers and activate the sensors. The sensor or switches can be mechanical, optical, or electrical; detecting forces, pressure, position, or moves.

Clicking moves are very short. Consequently, they do not bring about any harmful continuous strain in the user's hand, because the extensor tendons are relaxed all the time but activating clicks. Even the devices shown in FIGS. 12 to 14A are not usual, they are convenient and comfortable. Moreover, the housing shell of these embodiments can be shaped almost anyway for particular functional or ergonomic needs. The basic unbending function remains almost unaffected by a variety of shapes. It does not essentially depend on the shape of the supporting housing shell. These devices are, probably, of particular value for those users, whose hands were already injured by conventional mouses or other reasons. Indeed, the medical recommendation for injured hands is to essentially change the way of usual repetitive hand operation. Some of the safe devices presented here drastically change the way the user's hand operates. It gives the injured hand a chance of recovering by means of very light short time repetitive clicking movements and long relaxation periods. Some of the embodiments shown in FIGS. 1A–9D can be modified for unbending clicks, as shown in FIGS. 14A, B where the front push buttons are mounted adjacent to the back side of the fingers, that is in front of the front surface.

The conventional push buttons can be replaced here by substantially more sensitive pressure, touch, position, or proximity sensors. Therefore, the user does not need to apply any noticeable force on the clicking fingers but just show the command by a lightest finger move and then enjoy comfortable rest on the comfortable supporting housing shell. By this way, stressful and painful unsafe work with conventional mouses is converted into rather pleasant and useful gymnastics for the injured hand and fingers. The range of finger moves or a gap between the shell and the sensor or push button can be easily made adjustable for a particular user.

Both bending and unbending functionality (FIGS. 14A, B) can be provided in hand controller of the present invention as well. It increases the number of commands generated by simple finger moves, which is especially interesting for the free space or remote operations.

It is worth mentioning here ones more that usual repetitive strain injuries are generated by the constant tension of extensor tendons compressing relatively weak carpal contacts as opposed to relatively strong contacts compressed by the flexor (fist making) tendons. The most important trigger generating repetitive strain injuries deals with aggravated ligaments and joints, which finally compress the median nerve. The mechanism of aggravation consists, probably, not in only plain deformation but in severe distortion of normal feeding and regeneration function of the continuously compressed tissues. The hard connective tissues of joints are getting their feeding by very slow diffusion processes, not by the intensive blood supply as soft tissues like muscles and skin are fed from blood capillaries. Such diffusional feeding must be activated by periodic compressive load/unload of the tissues. That is why periodic short time clicking moves are noticeably opposite in their biological meaning and medical consequences to the constant tensions and stresses caused by conventional mouses. That is how the contradiction between the harmful continues and useful short stresses makes a prominent difference in the device functionality.

Conclusion, Ramification, and Scope

Accordingly, the reader will see that the handy and safe pointing devices of the present invention can be used for mission critical applications without a risk of getting the repetitive strain injuries. The devices can be continuously used for a protracted period, because they do not cause the involuntary tension in a hand and wrist, which is typical for all conventional mouses.

The present invention represents a new generation of handy and intrinsically safe pointing devices with improved dynamic functionality, substantially higher level of ergonomics, and a new concept of hand protection.

All and any of the pointing devices of the present invention protect a user's hand from unintentional activation of control buttons by a heavily loaded hand and fingers. Therefore, these devices eliminate the principal origin of repetitive strain injuries of computer users caused by a constant stress of the fingers operating the push buttons.

The present invention guaranties the discussed kind of protection by its very mechanical design. It is not just an improvement somewhat decreasing tension in a user's hand by a partial modification of the housing shell. It directly prohibits unintentional any activation by a heavily loaded relaxed hand. Consequently, the pointing devices of the present invention can be recognized as intrinsically safe as opposed to conventional unsafe design.

Although the above description contains many specifities, these should not be construed as limiting the scope of the invention but as merely providing illustrations of some of the presently preferred embodiments of this invention. For example, the device can be more or less upright, more or less compact, can have different anatomical depressions, ridges, and projections; can be made of a variety of materials; the actuators can be made of different structure and physical nature; it can be electrically or optically connected to a computer, etc. It especially concerns the devices with unbending finger action: any comfortable solid or even substantially deformable housings can be used without changing the basic safe function. The front surface can be made more or less rounded, convex or concave, the front actuators can be made sensing finger pressure, position, or movement or any combination. Positioning means and thumb actuators can be made as conventional mechanical ball-rollers, optical, ultrasonic, electric (capacitive array sensors), magnetic means, or their combinations. Certainly, any combination of the described embodiments can be realized within the same safe design concept. For example, the particular actuators and housing shapes from different embodiments can be combined in one. The vertical slope front actuator for a forefinger and essentially steep or inverted slope of about 100–180 degree can be used for middle and ring fingers, combined bending/unbending functions for different fingers can be adopted in the same device et cetera.

Thus, the scope of the invention should be determined by the appended claims and their legal equivalents, rather than by the examples given.

What is claimed is:

1. A pointing device for generating a plurality of computer input signals by a user's hand and control a cursor position on displays, the device being designed to prohibit a wrist stress and keep the wrist joint at safe and comfortable rest thus minimizing tension in the user's hand, avoid pain, fatigue, and computer generated repetitive strain injuries even during protracted periods of continuous use, comprising following mutually arranged elements:

(a) a generally flat bottom member for stably translatably positioning the device on an underlying substantially horizontal surface;

(b) a generally convex housing attached on top of said generally flat bottom member upon which to rest a hand;

(c) said generally convex housing having a contiguous front, top, and rear surface, left and right side surfaces to support a relaxed user's hand and proximal phalanges of fore-, middle-, and ring fingers;

(d) means for controlling the cursor position;

(e) a plurality of actuators for generating input signals;

(f) at least one to three of said actuators are mounted adjacent to said front surface to be in proximity to the relaxed fore-, middle or ring finger in highly operable position so that the front actuators are activatable by the fingers out of their relaxed position, while the hand itself rests in its relaxed position;

(g) the front actuators being designed to be sensitive to the finger moves directed substantially horizontally or vertically upward;

(h) the front actuators being designed protected from activation by substantially vertical downward loads.

2. The device of claim 1, wherein the front actuators are mounted on the front surface, wherein the front surface is made generally vertical, having an average slope up to about 130 degree relative to the bottom, wherein the housing is about 38–67 mm high at a front edge of the top surface, whereby a compact highly-functional fast pointing device is provided.

3. The device of claim 2 further comprising anatomical valleys and ridges, whereby user-friendlier grip is provided.

4. The device of claim 3, wherein the right side is about 20–60 percents lower than the left side, the top surface has a predetermined concave depression for a middle finger metacarpal joint, whereby a stress-free comfortable upright hand position is provided.

5. The device of claim 4 further comprising a thumb actuator mounted at about top of the left side surface, whereby said thumb actuator provides a plurality of functions like cursor positioning using ball-shaped positioning sensor, activation and scrolling menus, drag-lock, clicking.

6. The device of claim 5, wherein the housing is formed about 10–25% narrower, shorter, and higher, whereby the device can be firmly gripped by the thumb and small finger, and the hand wrist joint is substantially stretched unloading carpal pressure.

7. The device of claim 6, wherein the rear bottom is substantially projected in order to fully support the palm and wrist joint further comprising a depression to softly accommodate a pisiform carpal bone, whereby the allows a stress free and comfortable positioning of the hand.

8. The device of claim 1, wherein an upper front edge substantially projects forward, further comprising the front actuator mounted on the downward side of the projection, whereby the front actuators can be activated by substantially wrapped fore-, middle or ring finger and are protected from unintentional vertical downward and horizontal inward activation.

9. The device of claim 1, wherein the front-side actuators are mounted above the fingers, whereby the user's hand is safely resting on the shell of virtually any shape and activation clicks are performed by unbending or upward moves of fore-, middle, or ring finger.

10. The device of claim 9 further comprising a thumb actuator mounted on the left side, whereby said thumb actuator provides a plurality of additional functions like cursor positioning using ball-shaped positioning sensor, activating and scrolling menus, drag-lock, clicking.

11. The device of claim 1, wherein two kinds of the front actuators are mounted on and in front of the front surface, whereby bending and unbending clicking functionality is provided thus increasing the number of commands generated by the pointing device and a range of user's customizable options.

12. A pointing device for generating a plurality of computer input signals by a user's hand and control a cursor position on displays, the device being designed to prohibit a wrist stress and keep the wrist joint at safe and comfortable rest thus minimizing tension in the user's hand, avoid pain, fatigue, and computer generated repetitive strain injuries even during protracted periods of continuous use, comprising:

(a) a bottom member for carrying a hardware mechanism and positioning the device on an underlying substantially horizontal surface;

(b) a housing attached on top of said bottom member upon which to rest a hand;

(c) said generally convex housing having a contiguous front, top, rear surface, left and right side surfaces to support a relaxed user's hand and proximal phalanges of fore-, middle, and ring fingers so that the front actuators are activatable by the fingers out of their relaxed position, while the hand itself rests in its relaxed position;

(d) means for controlling the cursor position;

(e) a plurality of actuators;

(f) at least one to three, and preferably two, of said actuators are mounted above the user's fore-, middle or ring finger;

(g) the front actuators being designed to be sensitive to the finger moves directed substantially horizontally or vertically upward;

(h) the front actuators being designed protected from activation by substantially vertical downward loads.

13. The device of claim 12 further comprising a thumb actuator mounted on the left side, whereby said thumb actuator provides a plurality of functions like cursor positioning using ball-shaped positioning sensor, activating and scrolling menus, drag-lock, clicking.

14. The device of claim 13 further comprising substantially vertical front surface, wherein two kinds of the front actuators are mounted under and above user fingers, whereby bending and unbending clicking functionality is provided thus increasing the number of commands generated by the pointing device and expanding the range of user customizable options.

* * * * *

UNITED STATES PATENT AND TRADEMARK OFFICE
CERTIFICATE OF CORRECTION

PATENT NO.    : 6,664,947 B1  
DATED         : December 16, 2003  
INVENTOR(S)   : Vinogradov, G.K.

Page 1 of 1

It is certified that error appears in the above-identified patent and that said Letters Patent is hereby corrected as shown below:

Title page,  
Item [76], Inventor  
"Gueorgui K. Vinogradov, 5860-5  
  Ryuchi, Futaba-cho 306 Dragons  
  Mansion, Nakakoma-gun,  
  Yamanashi-Ken (JP), 407-0104" should read  
-- Georgy K. Vinogradov  
  7-43-18-502 KAMI-ASAO  
  ASAO-KU, KAWASAKI  
  215-0021 JAPAN --

Signed and Sealed this

Thirtieth Day of March, 2004

JON W. DUDAS  
*Acting Director of the United States Patent and Trademark Office*